US012640398B2

(12) United States Patent
Zhang et al.

(10) Patent No.: US 12,640,398 B2
(45) Date of Patent: May 26, 2026

(54) LITHIUM-ION BATTERY AND BATTERY MODULE, BATTERY PACK, AND ELECTRIC APPARATUS CONTAINING SAME

(71) Applicant: CONTEMPORARY AMPEREX TECHNOLOGY (HONG KONG) LIMITED, Hong Kong (CN)

(72) Inventors: Limei Zhang, Ningde City (CN); Peipei Chen, Ningde City (CN); Bangrun Wang, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 677 days.

(21) Appl. No.: 18/149,079

(22) Filed: Dec. 31, 2022

(65) Prior Publication Data

US 2023/0136779 A1 May 4, 2023

Related U.S. Application Data

(63) Continuation of application No. PCT/CN2021/122418, filed on Sep. 30, 2021.

(51) Int. Cl.
*H01M 10/0567* (2010.01)
*H01M 4/62* (2006.01)
*H01M 10/0525* (2010.01)
*H01M 4/02* (2006.01)

(52) U.S. Cl.
CPC ......... *H01M 10/0567* (2013.01); *H01M 4/62* (2013.01); *H01M 10/0525* (2013.01); *H01M 2004/021* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2007/0184347 A1* | 8/2007 | Stux | C01G 39/00 429/231.1 |
| 2012/0164533 A1* | 6/2012 | Senoue | H01M 4/525 429/219 |
| 2015/0372304 A1* | 12/2015 | Hasegawa | H01M 4/131 429/231.95 |
| 2016/0359196 A1 | 12/2016 | Kim et al. | |
| 2020/0091558 A1 | 3/2020 | Zhou et al. | |

FOREIGN PATENT DOCUMENTS

| | | | |
|---|---|---|---|
| CN | 104718658 | A | 6/2015 |
| CN | 105552344 | A | 5/2016 |
| CN | 106252710 | A | 12/2016 |
| CN | 107086324 | A | 8/2017 |
| CN | 107706351 | A | 2/2018 |
| CN | 108232343 | A | 6/2018 |
| CN | 108682894 | A | 10/2018 |
| CN | 105552344 | B | 12/2018 |
| CN | 109546150 | A | 3/2019 |
| CN | 110021785 | A | 7/2019 |
| CN | 110896143 | A | 3/2020 |
| CN | 110993933 | A | 4/2020 |
| CN | 111934017 | A | 11/2020 |
| CN | 112151889 | A | 12/2020 |
| CN | 112490490 | A | 3/2021 |
| CN | 113328082 | A | 8/2021 |
| CN | 110224169 | B | 9/2021 |
| EP | 3007263 | A1 | 4/2016 |
| EP | 2913880 | B1 | 1/2018 |
| EP | 3205655 | B1 | 6/2018 |
| EP | 3796432 | A1 | 3/2021 |
| JP | 2014-049295 | A | 3/2014 |
| KR | 20140140901 | A | 12/2014 |

OTHER PUBLICATIONS

The extended European search report received in the counterpart European Application 21944414.8, mailed on Nov. 13, 2024.
The partial supplementary European search report received in the corresponding European Application 21944414.8, mailed on Jul. 5, 2024.
International Search Report received in the corresponding International Application PCT/CN2021/122418, mailed May 26, 2022.
Written Opinion received in the corresponding International Application PCT/CN2021/122418, mailed May 26, 2022.
Office Action (with English Machine Translation), mailed Jul. 4, 2025, for corresponding Chinese Patent Application Serial No. 202180081929.X.
The second Office Action received in the counterpart CN Application No. 202180081929.X. dated Nov. 3, 2025, 20 pages with English translation.

* cited by examiner

*Primary Examiner* — Carlos Barcena
(74) *Attorney, Agent, or Firm* — K&L Gates LLP

(57) ABSTRACT

A lithium-ion battery and a battery module, a battery pack, and an electric apparatus containing the same are provided. The lithium-ion battery includes a positive electrode active material layer including a positive electrode active material and a pre-lithiation agent and an electrolyte including an additive, where the pre-lithiation agent is a lithium metal oxide pre-lithiation agent, the additive includes at least one of compound 1 shown in constitutional formula (I) and compound 2 shown in constitutional formula (II) below. In the following constitutional formula (I), $R_1$ is an oxygen atom or methylene, and $R_2$ is a hydrogen atom, a halogen atom, an alkyl group having 1 to 3 carbon atoms, a halogenated alkyl group having 1 to 3 carbon atoms.

17 Claims, 4 Drawing Sheets

LITHIUM-ION BATTERY AND BATTERY MODULE, BATTERY PACK, AND ELECTRIC APPARATUS CONTAINING SAME

CROSS-REFERENCE TO RELATED APPLICATIONS

This application is a continuation of International Application PCT/CN2021/122418, filed on Sep. 30, 2021 and entitled "LITHIUM-ION BATTERY AND BATTERY MODULE, BATTERY PACK, AND ELECTRIC APPARATUS CONTAINING SAME", which is incorporated herein by reference in its entirety.

TECHNICAL FIELD

This application relates to the field of lithium-ion batteries, and in particular, to a lithium-ion battery and a battery module, a battery pack, and an electric apparatus containing the same.

BACKGROUND

In recent years, with increasingly wide application of lithium-ion batteries, the lithium-ion batteries have been widely used in energy storage power supply systems such as water power stations, thermal power stations, wind power stations, and solar power stations, and in a plurality of fields such as electric tools, electric bicycles, electric motorcycles, electric vehicles, military equipment, and aerospace. Due to great expansion of the application fields of the lithium-ion batteries, higher requirements are imposed on energy density, cycling performance, high-temperature performance (especially high-temperature rate performance), and the like of the lithium-ion batteries.

To improve battery performance, the following technology has been proposed: a film forming additive is added to an electrolyte to form a film at a negative electrode, so as to suppress side reactions of the electrolyte at the negative electrode, thereby improving the battery performance. However, during charging of a lithium-ion battery, a solid electrolyte interface (SEI) film is formed on a surface of the negative electrode, which consumes a large number of lithium sources. In addition, lithium is converted into inactive lithium-containing compounds such as lithium carbonate, lithium fluoride, and alkyl lithium, which increases irreversible capacity of the lithium-ion battery and decreases initial coulombic efficiency and capacity of the battery. In a battery system with a graphite negative electrode, about 10% of lithium sources are consumed for initial charge, and the initial coulombic efficiency is about 90%. When a negative electrode is made of a material with high specific capacity, for example, alloy (silicon-, tin-, and aluminum-based alloy), oxide (silicon oxide, tin oxide, and titanium oxide), or amorphous carbon, more lithium sources are consumed.

To replenish lithium sources consumed and increase energy density of the lithium-ion battery, pre-lithiation for a positive or negative electrode is an effective method. For example, patent documentations CN 108232343A and CN 110993933A describe that during the initial charging, a pre-lithiation agent at a positive electrode releases lithium to provide additional lithium sources, so as to replenish lithium consumed by a SEI film formed at the positive and negative electrodes, thereby increasing energy density of the lithium-ion battery and the initial coulombic efficiency, and improving cycling performance of the battery.

Although using the pre-lithiation agent at the positive electrode effectively increases the initial coulombic efficiency and improves the cycling performance of the battery, the inventors of this application found through extensive and in-depth research that the battery described above has problems such as abnormal exploitable capacity and decreased rate performance, especially decreased rate performance after high-temperature storage.

SUMMARY

Technical Problems

Further, the inventors of this application found that a cause of the foregoing problems is that: during charging of a lithium-ion battery, a pre-lithiation agent at a positive electrode undergoes an irreversible phase transition during lithium releasing, and generates a product with poor ionic conductivity, which causes a decrease in ionic conductivity of a positive electrode plate. As a result, the lithium-ion battery suffers from problems such as abnormal exploitable capacity and decreased rate performance after high-temperature storage. For example, under the condition that a lithium metal oxide pre-lithiation agent is used as a positive electrode pre-lithiation agent, a structure of the pre-lithiation agent changes during charging (lithium releasing), and lithium vacancies therein are difficult to intercalate again. Therefore, during discharging, remaining lithium sources are all intercalated into a conventional positive electrode active material layer. Correspondingly, the pre-lithiation agent at the positive electrode is converted into a metal oxide after the lithium releasing and remains as such in a positive electrode plate. Due to poor ionic conductivity of the metal oxide, the lithium-ion battery has the problems such as abnormal exploitable capacity and decreased rate performance. In addition, the lithium-ion battery with the positive electrode pre-lithiation agent added has poorer rate performance after high-temperature storage, and a possible reason is that during the high-temperature storage, the metal oxide formed by the positive electrode pre-lithiation agent releasing lithium is in contact with an electrolyte to generate a by-product, further deteriorating the ionic conductivity of the positive electrode plate.

Technical Solutions

The inventors of this application propose the present invention to resolve the foregoing problems.

According to a first aspect of this application, a lithium-ion battery is provided, where the lithium-ion battery includes a positive electrode active material layer and an electrolyte,

- the positive electrode active material layer includes a positive electrode active material and a pre-lithiation agent, and the pre-lithiation agent is a lithium metal oxide pre-lithiation agent,
- the electrolyte includes an additive, and
- the additive includes at least one of compound 1 shown in constitutional formula (I) and compound 2 shown in constitutional formula (II), where constitutional formula (I)

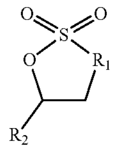

in the constitutional formula (I), $R_1$ is an oxygen atom or methylene, and $R_2$ is a hydrogen atom, a halogen atom, an alkyl group having 1 to 3 carbon atoms, a halogenated alkyl group having 1 to 3 carbon atoms, or an alkoxy group having 1 to 3 carbon atoms, and constitutional formula (II)

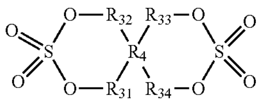

in the constitutional formula (II), $R_{31}$, $R_{32}$, $R_{33}$, and $R_{34}$ are each independently selected from a single bond or methylene, and $R_4$ is

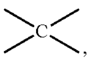, 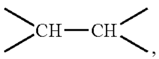, or 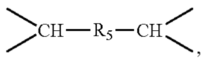, where $R_5$ is an alkylidene group having 1 to 3 carbon atoms, a halogenated alkylidene group having 1 to 3 carbon atoms, or an alkyleneoxy group having 1 to 3 carbon atoms.

In this embodiment, decrease in energy density of the battery caused by consumption of lithium sources in the battery is counteracted by adding the pre-lithiation agent to a positive electrode. In addition, a film with good ionic conductivity is formed on the pre-lithiation agent and/or the pre-lithiation agent with lithium released by adding the compound 1 and/or the compound 2 to the electrolyte, which can alleviate problems of the lithium-ion battery, for example, abnormal exploitable capacity and decreased rate performance, especially decreased rate performance after high-temperature storage, caused by reduced ionic conductivity of the pre-lithiation agent with lithium released. Moreover, because the film with good ionic conductivity is formed on the pre-lithiation agent, even if the pre-lithiation agent without lithium released releases lithium subsequently, ionic conductivity of the pre-lithiation agent with lithium released can also be improved. Therefore, the lithium-ion battery in this embodiment not only increases the energy density of the lithium-ion battery by adding the pre-lithiation agent to the positive electrode, but also increases the exploitable capacity of the lithium-ion battery and improves the rate performance of the lithium-ion battery, especially the rate performance after high-temperature storage, by adding the compound 1 and/or the compound 2 to the electrolyte. Therefore, the lithium-ion battery according to this embodiment has excellent specific capacity and rate performance, especially rate performance after high-temperature storage.

According to any aspect of this application, the pre-lithiation agent includes one or more of $Li_6CoO_4$, $Li_5FeO_4$, $Li_3VO_4$, $Li_2MoO_3$, $Li_2RuO_3$, $Li_2MnO_2$, $Li_2NiO_2$, and $Li_2Cu_xNi_{1-x}M_yO_2$, where $0<x\leq1$, and $0\leq y<0.1$, and M is one or more of Zn, Sn, Mg, Fe, and Mn; and optionally, the pre-lithiation agent includes one or more of $Li_6CoO_4$, $Li_5FeO_4$, $Li_2NiO_2$, $Li_2CuO_2$, and $Li_2Cu_{0.6}Ni_{0.4}O_2$. When the pre-lithiation agent is used, the specific capacity of the lithium-ion battery can be increased, and the rate performance of the lithium-ion battery, especially the rate performance after high-temperature storage, can be improved.

According to any aspect of this application, a mass percentage W1 of the pre-lithiation agent in the positive electrode active material layer satisfies $0.1\%\leq W1\leq10\%$, and optionally $0.5\%\leq W1\leq8\%$ or $1\%\leq W1\leq6\%$. When the pre-lithiation agent of the foregoing percentage is used, discharge capacity, coulombic efficiency, and cycling stability of the lithium-ion battery can be improved.

According to any aspect of this application, a median particle size by volume $D_v50$ of the pre-lithiation agent is 0.1 μm-30 μm, and a median particle size by volume $D_v50$ of the positive electrode active material is 0.1 μm-10 μm. When the median particle size by volume $D_v50$ of the pre-lithiation agent and the median particle size by volume $D_v50$ of the positive electrode active material are within the foregoing ranges, side reactions with the electrolyte can be suppressed and ionic conductivity of the positive electrode can be improved, thereby increasing the discharge capacity and coulombic efficiency of the lithium-ion battery and improving cycling stability of the lithium-ion battery.

According to any aspect of this application, a ratio A of the median particle size by volume $D_v50$ of the pre-lithiation agent to the median particle size by volume $D_v50$ of the positive electrode active material satisfies $1\leq A\leq10$, and optionally $2\leq A\leq8$. When A is within the foregoing range, ionic conductivity of a positive electrode plate can be ensured and a contact area between the positive electrode pre-lithiation agent and the electrolyte can be reduced, thereby further increasing the exploitable capacity of the lithium-ion battery and improving the rate performance of the lithium-ion battery.

According to any aspect of this application, in the constitutional formula (II), $R_4$ is

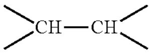 or 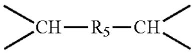, where $R_5$ is an alkylidene group having 1 to 3 carbon atoms or an alkyleneoxy group having 1 to 3 carbon atoms.

According to any aspect of this application, the compound 1 includes one or more of the following compounds:

compound 1-1

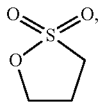, compound 1-2

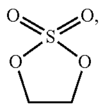, compound 1-3

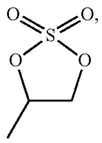, compound 1-4

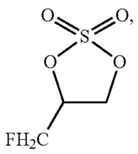,

-continued compound 1-5

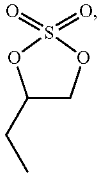 and compound 1-6

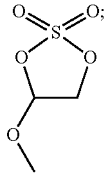

and the compound 2 includes one or more of the following compounds:

compound 2-1

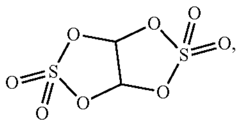

compound 2-2

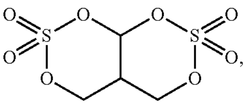

compound 2-3

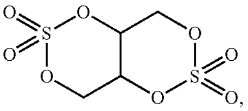

compound 2-4

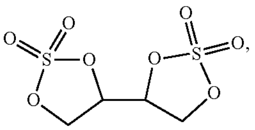

compound 2-5

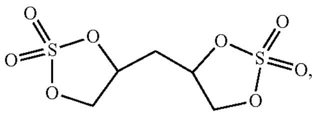 and compound 2-6

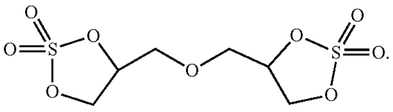

When the additive is used, the specific capacity of the lithium-ion battery can be increased, and the rate performance of the lithium-ion battery, especially the rate performance after high-temperature storage, can be improved.

According to any aspect of this application, a mass percentage W2 of the compound 1 and the compound 2 in the electrolyte satisfies 0.01%≤W2≤20%, and optionally 0.1%≤W2≤10% or 0.5%≤W2≤5%. When W2 is within the foregoing range, the specific capacity of the lithium-ion battery can be increased, and the rate performance of the lithium-ion battery, especially the rate performance after high-temperature storage, can be improved.

According to any aspect of this application, a molar ratio B of a sum of the compound 1 and the compound 2 to the pre-lithiation agent satisfies 0.01≤B≤2.3. When B is within the foregoing range, the ionic conductivity of the positive electrode plate can be ensured without degradation of battery performance, thereby increasing the exploitable capacity of the lithium-ion battery and improving the rate performance of the lithium-ion battery.

According to a second aspect of this application, a lithium-ion battery is provided, where the lithium-ion battery is a lithium-ion battery obtained by charging the lithium-ion battery according to the foregoing embodiment, where during the charging, the compound 1 and the compound 2 in the electrolyte of the lithium-ion battery form a film on the pre-lithiation agent and/or the pre-lithiation agent with lithium released. The lithium-ion battery has excellent specific capacity and rate performance, especially rate performance after high-temperature storage.

According to any aspect of this application, after the film forming, a molar ratio C of element S contained in the positive electrode plate to a sum of the pre-lithiation agent and the pre-lithiation agent with lithium released satisfies 0.01≤C≤1. When the ratio C is within the foregoing range, the ionic conductivity of the positive electrode plate can be ensured without degradation of the battery performance, thereby increasing the exploitable capacity of the lithium-ion battery and improving the rate performance of the lithium-ion battery.

According to a third aspect of this application, a battery module is provided, and the battery module includes the lithium-ion battery. The battery module has excellent specific capacity and rate performance, especially rate performance after high-temperature storage.

According to a fourth aspect of this application, a battery pack is provided, and the battery pack includes the battery module. The battery pack has excellent specific capacity and rate performance, especially rate performance after high-temperature storage.

According to a fifth aspect of this application, an electric apparatus is provided, and the electric apparatus includes at least one of the lithium-ion battery, the battery module, or the battery pack. The electric apparatus has excellent specific capacity and rate performance, especially rate performance after high-temperature storage.

Beneficial Effects

This application provides a lithium-ion battery, and the lithium-ion battery can alleviate problems of the lithium-ion battery, for example, abnormal exploitable capacity and decreased rate performance, especially decreased rate performance after high-temperature storage, caused by reduced ionic conductivity of a pre-lithiation agent with lithium released. Therefore, the lithium-ion battery according to this embodiment has excellent specific capacity and rate performance, especially rate performance after high-temperature storage. In addition, this application provides a battery module, a battery pack, and an electric apparatus containing the lithium-ion battery. The battery module, the battery pack, and the electric apparatus have excellent specific capacity and rate performance, especially rate performance after high-temperature storage.

Figure 1:
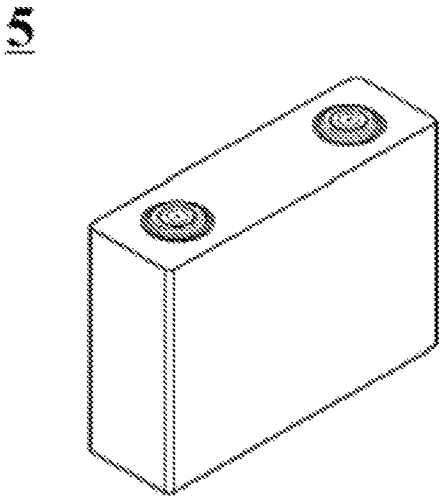
FIG. 1 is a schematic diagram of a lithium-ion battery according to an embodiment of this application.

Reference signs are described as follows:

1. battery pack; 2. upper box body; 3. lower box body; 4. battery module; 5. lithium-ion battery; 51 housing; 52. electrode assembly; and 53. top cover assembly

DESCRIPTION OF EMBODIMENTS

The following describes in detail a lithium-ion battery in this application. However, unnecessary detailed descriptions may be omitted. For example, detailed descriptions of a well-known matter or overlapping descriptions of an actual identical structure have been omitted. This is to avoid unnecessary cumbersomeness of the following descriptions, to facilitate understanding by persons skilled in the art. In addition, the following descriptions and embodiments are provided for persons skilled in the art to fully understand this application and are not intended to limit the subject described in the claims.

Unless otherwise specified, all the embodiments and optional embodiments of this application can be mutually combined to form a new technical solution.

Unless otherwise specified, all the technical features and optional technical features of this application can be mutually combined to form a new technical solution.

A first embodiment of this application may provide a lithium-ion battery, where the lithium-ion battery includes a positive electrode active material layer and an electrolyte, the positive electrode active material layer includes a positive electrode active material and a pre-lithiation agent, and the pre-lithiation agent is a lithium metal oxide pre-lithiation agent, the electrolyte includes an additive, and the additive includes compound 1 shown in constitutional formula (I) and/or compound 2 shown in constitutional formula (II), where consitutional formula (I)

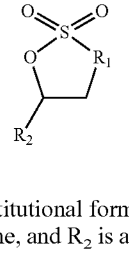

in the constitutional formula (I), $R_1$ is an oxygen atom or methylene, and $R_2$ is a hydrogen atom, a halogen atom, an alkyl group having 1 to 3 carbon atoms, a halogenated alkyl group having 1 to 3 carbon atoms, or an alkoxy group having 1 to 3 carbon atoms, and constitutional formula (II)

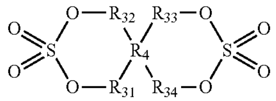

in the constitutional formula (II), $R_{31}$, $R_{32}$, $R_{33}$, and $R_{34}$ are each independently selected from a single bond or methylene, and $R_4$ is

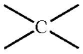
,
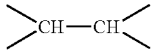
, or
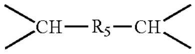
, where $R_5$ is an alkylidene group having 1 to 3 carbon atoms, a halogenated alkylidene group having 1 to 3 carbon atoms, or an alkyleneoxy group having 1 to 3 carbon atoms.

In the constitutional formula (I), $R_2$ is a hydrogen atom, a halogen atom, an alkyl group having 1 to 3 carbon atoms, a halogenated alkyl group having 1 to 3 carbon atoms, or an alkoxy group having 1 to 3 carbon atoms. The halogen atom may be, for example, a fluorine atom, a chlorine atom, a bromine atom, an iodine atom, or the like, and preferably a fluorine atom or a chlorine atom. The alkyl group having 1 to 3 carbon atoms may be, for example, a methyl group, an ethyl group, an n-propyl group, or an isopropyl group, and preferably a methyl group or an ethyl group. The halogenated alkyl group having 1 to 3 carbon atoms may be, for example, a monohalogenated alkyl group having 1 to 3 carbon atoms, a dihalogenated alkyl group having 1 to 3 carbon atoms, or the like, and preferably a monohalogenated alkyl group having 1 to 3 carbon atoms. The alkoxy group having 1 to 3 carbon atoms may be, for example, a methoxy group, an ethoxy group, an isopropoxy group, or the like, preferably a methoxy group or an ethoxy group, and more preferably a methoxy group.

In the constitutional formula (II), $R_5$ is an alkylidene group having 1 to 3 carbon atoms, a halogenated alkylidene group having 1 to 3 carbon atoms, or an alkyleneoxy group having 1 to 3 carbon atoms. The alkylidene group having 1 to 3 carbon atoms may be, for example, a methylene group, an ethylene group, a propylene group, or the like, and preferably a methylene group. The halogenated alkylidene group having 1 to 3 carbon atoms may be, for example, a monohalogenated alkylidene group having 1 to 3 carbon atoms, a dihalogenated alkylidene group having 1 to 3 carbon atoms, or the like, and preferably a monohalogenated alkylidene group having 1 to 3 carbon atoms. The alkyleneoxy group having 1 to 3 carbon atoms may be, for example, a methyleneoxy group, an ethyleneoxy group, or a propyleneoxy group, and preferably an ethyleneoxy group.

As described above, the inventors of this application found through extensive and in-depth research that a battery using the pre-lithiation agent at a positive electrode has problems such as abnormal exploitable capacity and decreased rate performance, especially decreased rate performance after high-temperature storage. In addition, the inventors found through further research that a cause of the problems is that the pre-lithiation agent has poor ionic conductivity due to constitution changes. However, the problems and technologies about how to improve ionic conductivity of a pre-lithiation agent with lithium released have not been reported yet in the prior art.

To solve the foregoing problems, the inventors of this application found through research that an ionic conductivity film may be formed on the pre-lithiation agent and/or the pre-lithiation agent with lithium released during charging of the battery by adding the compound 1 and/or the compound 2 to the electrolyte. The ionic conductivity film can improve the ionic conductivity of the pre-lithiation agent with lithium released, and improve ionic conductivity of a positive electrode plate, thereby increasing the exploitable capacity of the lithium-ion battery and improving the rate performance of the lithium-ion battery. In addition, the ionic conductivity film can effectively prevent the pre-lithiation agent and/or the pre-lithiation agent with lithium released from coming into contact with the electrolyte to generate a by-product during the high-temperature storage, thereby improving the rate performance after the high-temperature storage. Therefore, the lithium-ion battery according to this embodiment has excellent specific capacity and rate performance, especially rate performance after high-temperature storage.

From the perspective of increasing the specific capacity of the lithium-ion battery and improving the rate performance of the lithium-ion battery, especially the rate performance after high-temperature storage, the pre-lithiation agent in this embodiment may include one or more of $Li_6CoO_4$, $Li_5FeO_4$, $Li_3VO_4$, $Li_2MoO_3$, $Li_2RuO_3$, $Li_2MnO_2$, $Li_2NiO_2$, and $Li_2Cu_xNi_{1-x}M_yO_2$, where $0<x\leq1$, and $0\leq y<0.1$, and M is one or more of Zn, Sn, Mg, Fe, and Mn.

From the perspective of increasing the specific capacity of the lithium-ion battery and improving the rate performance of the lithium-ion battery, especially the rate performance after high-temperature storage, the pre-lithiation agent in this embodiment preferably includes one or more of $Li_6CoO_4$, $Li_5FeO_4$, $Li_2NiO_2$, $Li_2CuO_2$, and $Li_2Cu_{0.6}Ni_{0.4}O_2$.

From the perspective of increasing discharge capacity and coulombic efficiency of the lithium-ion battery and improving cycling stability of the lithium-ion battery, a mass percentage W1 of the pre-lithiation agent in the positive electrode active material layer in this embodiment may satisfy $0.1\%\leq W1\leq10\%$, and preferably $0.5\%\leq W1\leq8\%$, $1\%\leq W1\leq6\%$, $1.5\%\leq W1\leq6\%$, $1.8\%\leq W1\leq5.8\%$, $1.9\%\leq W1\leq5.6\%$, $2\%\leq W1\leq5.5\%$, or $2\%\leq W1\leq5\%$.

From the perspective of suppressing side reactions with the electrolyte and improving ionic conductivity of the positive electrode to increase the discharge capacity and coulombic efficiency of the lithium-ion battery and improve the cycling stability of the lithium-ion battery, a median particle size by volume $D_v50$ of the pre-lithiation agent in this embodiment may be 0.1 μm-30 μm, and preferably 1 μm-15 μm, 2 μm-12 μm, 3 μm-10 μm, or 4 μm-8 μm; and a median particle size by volume $D_v50$ of the positive electrode active material may be 0.1 μm-10 μm, and preferably 0.5 μm-5 μm, 0.5 μm-3 μm, 0.8 μm-2 μm, or 1 μm-1.8 μm.

A ratio A of the median particle size by volume $D_v50$ of the pre-lithiation agent in this embodiment to the median particle size by volume $D_v50$ of the positive electrode active material may satisfy $1\leq A\leq10$, and preferably $2\leq A\leq8$, $3\leq A\leq7$, or $4\leq A\leq6$.

The ratio A of the median particle size by volume $D_v50$ of the pre-lithiation agent to the median particle size by volume $D_v50$ of the positive electrode active material affects the ionic conductivity of the positive electrode plate. As the ratio A is decreased, the ionic conductivity of the positive electrode plate is improved. However, a contact area between the positive electrode pre-lithiation agent and the electrolyte is increased, which increases the side reactions and decreases the exploitable capacity of the lithium-ion battery. Conversely, when the ratio A is increased, the ionic conductivity of the positive electrode plate may be reduced. When A is within the foregoing range, the ionic conductivity of the positive electrode plate can be ensured and the contact area between the positive electrode pre-lithiation agent and the electrolyte can be reduced, thereby further increasing the exploitable capacity of the lithium-ion battery and improving the rate performance of the lithium-ion battery.

From the perspective of increasing the specific capacity of the lithium-ion battery and improving the rate performance of the lithium-ion battery, especially the rate performance after high-temperature storage, in the constitutional formula (II), $R_4$ may be

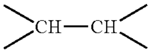 or 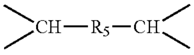, where $R_5$ may be an alkylidene group having 1 to 3 carbon atoms or an alkyleneoxy group having 1 to 3 carbon atoms.

From the perspective of increasing the specific capacity of the lithium-ion battery and improving the rate performance of the lithium-ion battery, especially the rate performance after high-temperature storage, the compound 1 preferably includes one or more of the following compounds:

compound 1-1

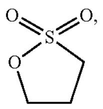

compound 1-2

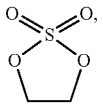

compound 1-3

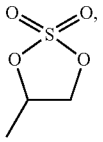

compound 1-4

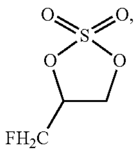

compound 1-5

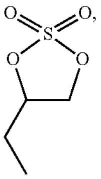 and compound 1-6

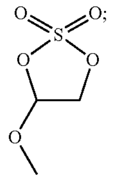

and the compound 2 preferably includes one or more of the following compounds:

compound 2-1

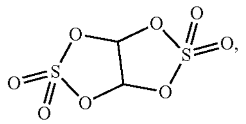

compound 2-2

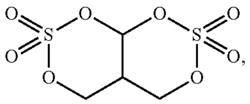

compound 2-3

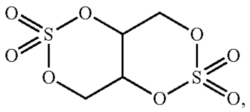

compound 2-4

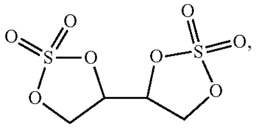

compound 2-5

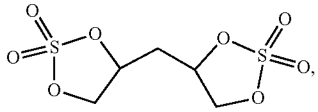

and compound 2-6

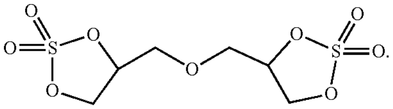

The inventors of this application found that when the pre-lithiation agent is selected from one or more of $Li_6CoO_4$, $Li_5FeO_4$, $Li_2NiO_2$, $Li_2CuO_2$, and $Li_2Cu_{0.6}Ni_{0.4}O_2$, adding one or more of the compounds 1-1 to 1-6 and the compounds 2-1 to 2-6 to the electrolyte can better increase the specific capacity of the lithium-ion battery and improve the rate performance of the lithium-ion battery, especially the rate performance after high-temperature storage. It is supposed that a reason may be that using the pre-lithiation agent and the electrolyte additive in combination has a synergistic effect on increasing the specific capacity of the lithium-ion battery and improving the rate performance of the lithium-ion battery, especially the rate performance after high-temperature storage, which can better increase the specific capacity of the lithium-ion battery and improve the rate performance of the lithium-ion battery, especially the rate performance after high-temperature storage.

From the perspective of increasing the specific capacity of the lithium-ion battery and improving the rate performance of the lithium-ion battery, especially the rate performance after high-temperature storage, a mass percentage W2 of the compound 1 and the compound 2 in the electrolyte additive in the electrolyte in this embodiment satisfies $0.01\% \le W2 \le 20\%$, and preferably $0.1\% \le W2 \le 10\%$, $0.5\% \le W2 \le 5\%$, $1\% \le W2 \le 4\%$, or $1\% \le W2 \le 2\%$. In addition, considering the synergistic effect of the pre-lithiation agent and the electrolyte additive on increasing the specific capacity of the lithium-ion battery and improving the rate performance of the lithium-ion battery, especially the rate performance after high-temperature storage, persons skilled in the art may select a suitable percentage of the electrolyte additive within the foregoing range based on types of the pre-lithiation agent.

According to any aspect of this application, a molar ratio B of a sum of the compound 1 and the compound 2 to the pre-lithiation agent satisfies $0.01 \le B \le 2.3$. When B is within the foregoing range, the ionic conductivity of the positive electrode plate can be ensured without degradation of battery performance, thereby increasing the exploitable capacity of the lithium-ion battery and improving the rate performance of the lithium-ion battery.

A second embodiment of this application may provide a lithium-ion battery, where the lithium-ion battery is a lithium-ion battery obtained by charging the lithium-ion battery according to the foregoing embodiment, where during the charging, the compound 1 and the compound 2 in the electrolyte of the lithium-ion battery form a film on the pre-lithiation agent and/or the pre-lithiation agent with lithium released. The lithium-ion battery has excellent specific capacity and rate performance, especially rate performance after high-temperature storage.

According to the second embodiment of this application, after the film forming, a molar ratio C of element S contained in the positive electrode plate to a sum of the pre-lithiation agent and the pre-lithiation agent with lithium released satisfies $0.01 \le C \le 1$, and preferably $0.05 \le C \le 0.8$, $0.05 \le C \le 0.6$, $0.06 \le C \le 0.2$, or $0.08 \le C \le 0.15$.

After the charging of the lithium-ion battery, the molar ratio C of the element S in the positive electrode plate to the sum of the pre-lithiation agent and the pre-lithiation agent with lithium released (that is a percentage of the pre-lithiation agent added initially) also affects ionic conductivity of the positive electrode plate. When the molar ratio C is $\ge 0.01$, it can be ensured that an ionic conductivity film is formed on a surface of the pre-lithiation agent with lithium released, which improves ionic conductivity of the pre-lithiation agent with lithium released. However, when the ratio C is too large, impedance of the positive electrode plate may be increased, capacity of the lithium-ion battery may be decreased, and the rate performance after high-temperature storage may be deteriorated. When the ratio C is within the foregoing range, the ionic conductivity of the positive electrode plate can be ensured without degradation of the battery performance, thereby further increasing the exploitable capacity of the lithium-ion battery and improving the rate performance of the lithium-ion battery.

Detailed Descriptions of Embodiments of this Application

The following describes in detail a lithium-ion battery, a battery module, a battery pack, and an electric apparatus in this application with appropriate reference to the accompanying drawings.

In an embodiment of this application, a lithium-ion battery is provided.

Generally, the lithium-ion battery includes a positive electrode plate, a negative electrode plate, an electrolyte, and a separator. During charging and discharging of the battery, lithium ions are intercalated and deintercalated back and forth between the positive electrode plate and the negative electrode plate. The electrolyte conducts the lithium ions between the positive electrode plate and the negative electrode plate. The separator is disposed between the positive electrode plate and the negative electrode plate to mainly prevent a short circuit between positive and negative electrodes and to allow the ions to pass through. In some cases, for example, under the condition that a gel polymer electrolyte is used as the electrolyte, the electrolyte can function as the separator. In this case, the lithium-ion battery may include a positive electrode plate, a negative electrode plate, and an electrolyte, without a separate separator. The following describes in detail constituent elements of the lithium-ion battery.

[Positive Electrode Plate]

The positive electrode plate includes a positive electrode current collector and a positive electrode active material layer disposed on at least one surface of the positive electrode current collector. The positive electrode active material layer may include a positive electrode active material and a pre-lithiation agent, and optionally a binder and a conductive agent.

In an example, the positive electrode current collector includes two back-to-back surfaces in a thickness direction of the positive electrode current collector, and the positive electrode active material layer is disposed on either or both of the two back-to-back surfaces of the positive electrode current collector.

In some embodiments, the positive electrode current collector may be a metal foil or a composite current collector. For example, an aluminum foil may be used as the metal foil. The composite current collector may include a polymer material matrix and a metal layer formed on at least one surface of the polymer material matrix. The composite current collector may be formed by forming a metal material (for example, aluminum, aluminum alloy, nickel, nickel alloy, titanium, titanium alloy, silver, and silver alloy) on the polymer material matrix (such as matrices of polypropylene (PP), polyethylene terephthalate (PET), polybutylene terephthalate (PBT), polystyrene (PS), and polyethylene (PE)).

In some embodiments, the positive electrode active material may be a well-known positive electrode active material used for a lithium-ion battery in the art. In an example, the positive electrode active material may include at least one of the following materials: olivine-structured lithium-containing phosphate, lithium transition metal oxide, and respective modified compounds thereof. However, this application is not limited to these materials, and may also use other conventional materials that can be used as the positive electrode active material of the lithium-ion battery. One type of these positive electrode active materials may be used alone, or two or more types may be used in combination. An example of the lithium transition metal oxide may include but is not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. An example of the olivine-structured lithium-containing phosphate may include but is not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In these embodiments of this application, the positive electrode active material layer includes a pre-lithiation agent. The pre-lithiation agent may include a pre-lithiation agent usually used in the art. Specifically, the pre-lithiation agent may include one or more of $Li_6CoO_4$, $Li_5FeO_4$, $Li_3VO_4$, $Li_2MoO_3$, $Li_2RuO_3$, $Li_2MnO_2$, $Li_2NiO_2$, and $Li_2Cu_xNi_{1-x}M_yO_2$, where $0<x\leq1$, and $0\leq y<0.1$, and M is one or more of Zn, Sn, Mg, Fe, and Mn. From the perspective of increasing the specific capacity of the lithium-ion battery and improving the rate performance of the lithium-ion battery, especially the rate performance after high-temperature storage, the pre-lithiation agent preferably includes one or more of $Li_6CoO_4$, $Li_5FeO_4$, $Li_2NiO_2$, $Li_2CuO_2$, and $Li_2Cu_{0.6}Ni_{0.4}O_2$.

In some embodiments, the positive electrode active material layer may further optionally include a binder. In an example, the binder may include at least one of groups consisting of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode active material layer may further optionally include a conductive agent. In an example, a conductive agent usually used in the art may be used. The conductive agent may include at least one of superconducting carbon, acetylene black, carbon black, Ketjen black, carbon nanotube, carbon nanorod, graphene, and carbon nanofiber.

In some embodiments, the positive electrode plate may be prepared by using the following manners: the constituents used for preparing the positive electrode plate, for example, the positive electrode active material, the conductive agent, the binder, and any other constituent, are dissolved in a solvent (for example, N-methylpyrrolidone) to form a positive electrode slurry. The positive electrode slurry is applied onto the positive electrode current collector, and processes such as drying and cold pressing are performed to obtain the positive electrode plate. Alternatively, in another embodiment, the positive electrode plate may be prepared by using the following manners: a positive electrode slurry used for forming the positive electrode active material layer is cast on a separate carrier, and then a film layer obtained by peeling off the positive electrode slurry from the carrier is pressed on the positive electrode current collector.

[Negative Electrode Plate]

The negative electrode plate includes a negative electrode current collector and a negative electrode active material layer disposed on at least one surface of the negative electrode current collector. The negative electrode active material layer may include a negative electrode active material, and optionally a binder, a conductive agent, and other adjuvant.

In an example, the negative electrode current collector includes two back-to-back surfaces in a thickness direction of the negative electrode current collector, and the negative electrode active material layer is disposed on either or both of the two back-to-back surfaces of the negative electrode current collector.

In some embodiments, the negative electrode current collector may be a metal foil or a composite current collector. For example, a copper foil may be used as the metal foil. The composite current collector may include a polymer material matrix and a metal layer formed on at least one surface of the polymer material matrix. The composite current collector may be formed by forming a metal material (for example, copper, copper alloy, nickel, nickel alloy, titanium, titanium alloy, silver, and silver alloy) on the polymer material matrix (such as matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. In an example, the negative electrode active material may include at least one of the following materials: artificial graphite, natural graphite, soft carbon, hard carbon, a silicon-based material, a tin-based material, and lithium titanate. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and may also use other conventional materials that can be used as the negative electrode active material of the battery. One type of these negative electrode active materials may be used alone, or two or more types may be used in combination.

In some embodiments, the negative electrode active material layer may further optionally include a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active material layer may further optionally include a conductive agent. The conductive agent may be selected from at least one of superconducting carbon, acetylene black, carbon black, Ketjen black, carbon nanotube, carbon nanorod, graphene, and carbon nanofiber.

In some embodiments, the negative electrode active material layer may further optionally include other adjuvant, such as a thickener (for example, sodium carboxymethyl cellulose (CMC-Na)).

In some embodiments, the negative electrode plate may be prepared by using the following manners: the constituents used for preparing the negative electrode plate, for example, the negative electrode active material, the conductive agent, the binder, and any other constituent, are dissolved in a solvent (for example, deionized water) to form a negative electrode slurry. The negative electrode slurry is applied onto the negative electrode current collector, and processes such as drying and cold pressing are performed to obtain the negative electrode plate. Alternatively, in another embodiment, the negative electrode plate may be prepared by using the following manners: a negative electrode slurry used for forming the negative electrode active material layer is cast on a separate carrier, and then a film layer obtained by peeling off the negative electrode slurry from the carrier is pressed on the negative electrode current collector.

[Electrolyte]

The electrolyte conducts ions between the positive electrode plate and the negative electrode plate. The electrolyte is not limited to any specific type in this application, and may be selected as required. For example, the electrolyte may be in a liquid state, a gel state, or an all-solid state. In addition, as described above, in some cases, for example, under the condition that a gel polymer electrolyte is used as the electrolyte, the electrolyte can function as a separator. In this case, the lithium-ion battery may include a positive electrode plate, a negative electrode plate, and an electrolyte, without a separate separator.

In addition, the electrolyte in the embodiments of this application includes an additive. In addition to compound 1 shown in constitutional formula (I) and/or compound 2 shown in constitutional formula (II), the additive may further include other additives usually used in the art. The additive may include, for example, a halogenated alkylene carbonate compound (for example, difluoroethylene carbonate), pyridine, triethyl phosphite, triethanolamine, cyclic ether, ethylenediamine, (condensed) glycol dimethyl ether, hexamethylphosphate triamide, nitrobenzene derivative, sulfur, quinoneimine dye, N-substituted oxazolidinone, N,N-substituted imidazolidine, ethylene glycol dialkyl ether, ammonium salt, pyrrole, 2-methoxyethanol, or aluminium chloride. In this case, based on a total weight of the electrolyte, a percentage of the contained additive may be 0.1 wt % to 5 wt %, or is adjusted by persons skilled in the art based on actual demands.

In some embodiments, the electrolyte is a liquid electrolyte. The liquid electrolyte includes an electrolyte salt and a solvent.

In some embodiments, the electrolyte salt may be selected from at least one of lithium hexafluorophosphate, lithium tetrafluoroborate, lithium perchlorate, lithium hexafluoroborate, lithium bisfluorosulfonyl imide, lithium bis-trifluoromethanesulfon imide, lithium trifluoromethanesulfonat, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

[Separator]

In some embodiments, the lithium-ion battery further includes a separator. The separator is not limited to any specific type in this application, and may be any well-known porous separator with good chemical stability and mechanical stability. In addition, the separator preferably has excellent ion permeability and electrolyte moisturizing capacity.

In some embodiments, a material of the separator may be selected from at least one of glass fiber, non-woven fabric, polyethylene, polypropylene, and polyvinylidene fluoride. The separator is not limited to any specific form, and may be a single-layer thin film or a multi-layer composite thin film. When the separator is a multi-layer composite thin film, all layers may be made of same or different materials, which is not particularly limited.

In some embodiments, the positive electrode plate, the negative electrode plate, and the separator may be made into an electrode assembly through winding or lamination.

In some embodiments, the lithium-ion battery may include an outer package. The outer package may be used for packaging the electrode assembly and the electrolyte.

In some embodiments, the outer package of the lithium-ion battery may be a hard shell, for example, a hard plastic shell, an aluminum shell, or a steel shell. The outer package of the lithium-ion battery may alternatively be a soft pack, for example, a soft pouch. A material of the soft pack may be plastic. Polypropylene, polybutylene terephthalate, polybutylene succinate, and the like may be listed as the plastic.

The lithium-ion battery is not limited to any specific shape in this application, and the lithium-ion battery may be cylindrical, rectangular, or of any other shape. For example, FIG. 1 shows a lithium-ion battery 5 of a rectangular structure as an example.

Figure 2:
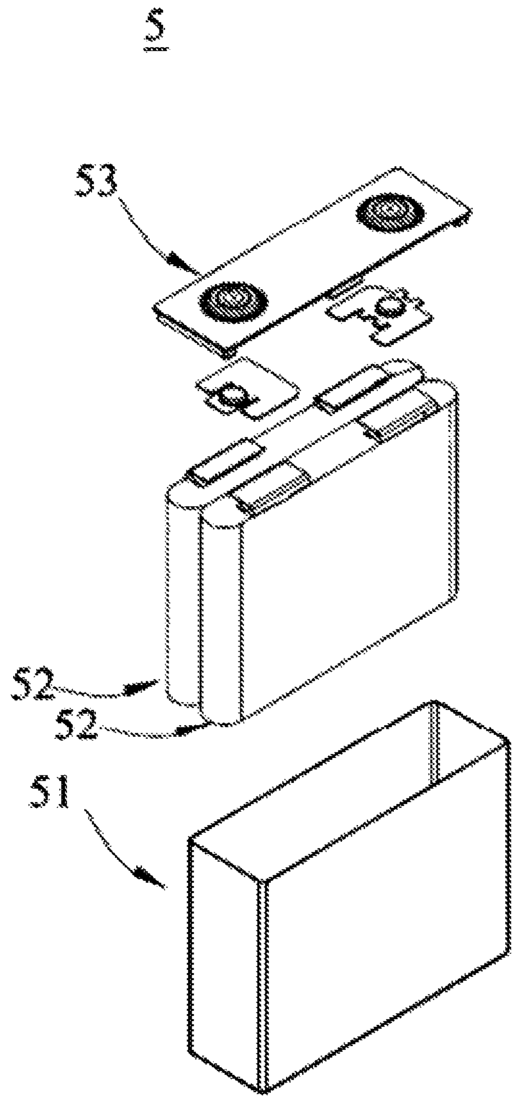
FIG. 2 is an exploded view of the lithium-ion battery according to the embodiment of this application shown in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening in communication with the accommodating cavity, and the cover plate 53 can cover the opening to close the accommodating cavity. A positive electrode plate, a negative electrode plate, and a separator may be made into an electrode assembly 52 through winding or lamination. The electrode assembly 52 is packaged in the accommodating cavity. The electrolyte is infiltrated into the electrode assembly 52. The lithium-ion battery 5 may include one or more electrode assemblies 52, and persons skilled in the art may make selection based on actual requirements.

In some embodiments, the lithium-ion batteries may be assembled into a battery module, and the battery module may include one or more lithium-ion batteries. A specific quantity may be selected by persons skilled in the art based on use and capacity of the battery module.

Figure 3:
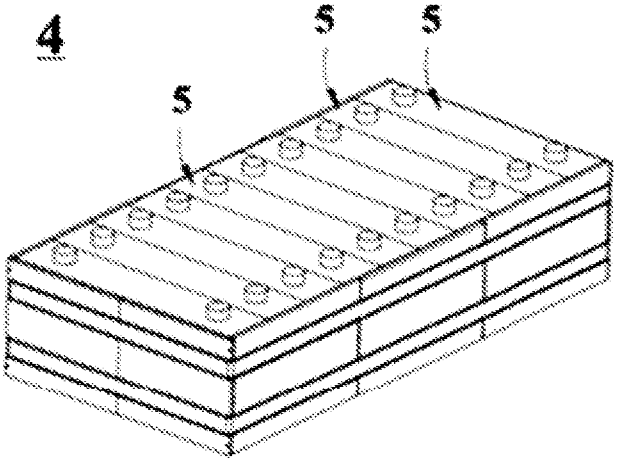
FIG. 3 is a schematic diagram of a battery module according to an embodiment of this application.

FIG. 3 shows a battery module 4 as an example. Referring to FIG. 3, in the battery module 4, a plurality of lithium-ion batteries 5 are sequentially arranged in a length direction of the battery module 4. Certainly, the plurality of lithium-ion batteries 5 may alternatively be arranged in any other manner. Further, the plurality of lithium-ion batteries 5 may be fixed by using fasteners.

Optionally, the battery module 4 may further include a housing with an accommodating space, and the plurality of lithium-ion batteries 5 are accommodated in the accommodating space.

In some embodiments, the battery modules may be further assembled into a battery pack. The battery pack may include one or more battery modules, and a specific quantity may be selected by persons skilled in the art based on use and capacity of the battery pack.

Figure 4:
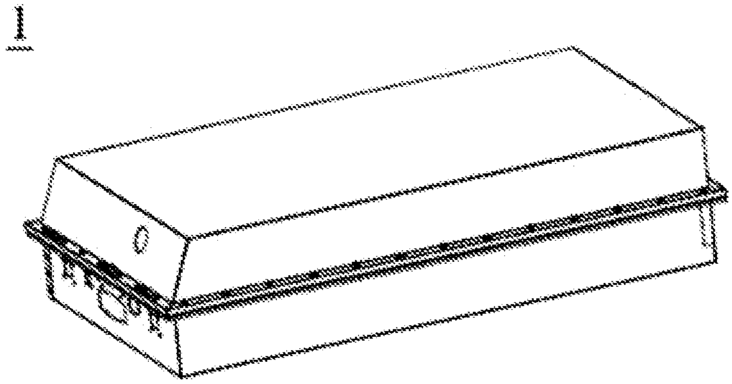
FIG. 4 is a schematic diagram of a battery pack according to an embodiment of this application.
Figure 5:
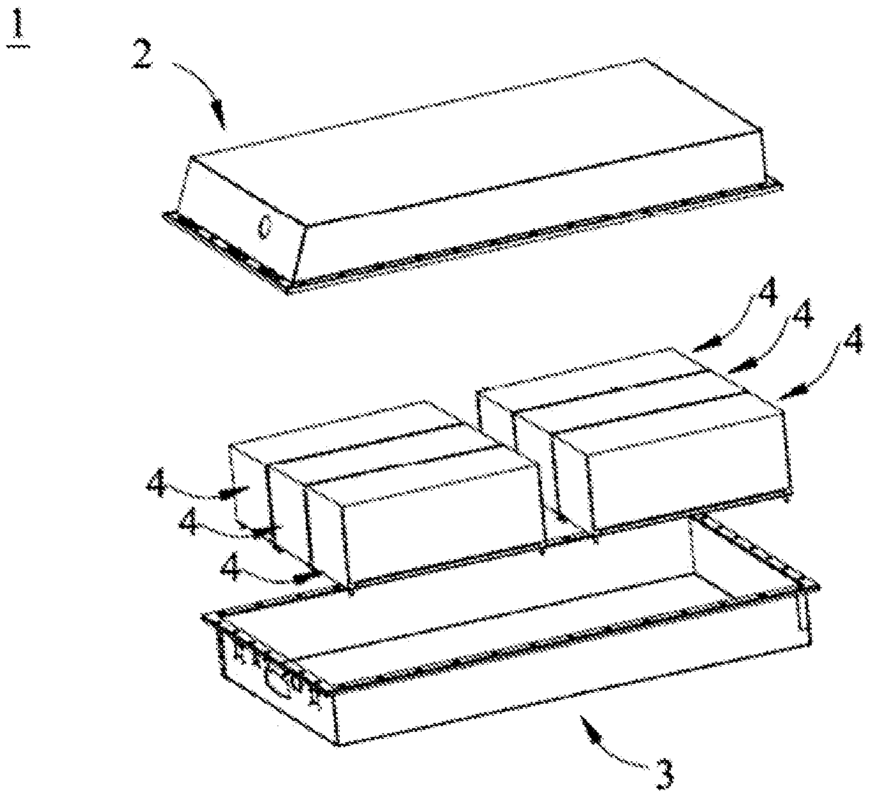
FIG. 5 is an exploded view of the battery pack according to the embodiment of this application shown in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the lithium-ion battery, the battery module, or the battery pack according to this application. The lithium-ion battery, the battery module, or the battery pack may be used as a power source for the electric apparatus, or an energy storage unit of the electric apparatus. The electric apparatus may include but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, and an energy storage system.

A lithium-ion battery, a battery module, or a battery pack may be selected for the electric apparatus based on requirements for using the electric apparatus.

Figure 6:
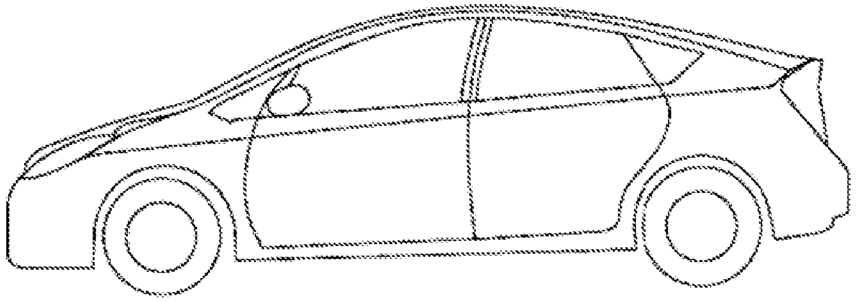
FIG. 6 is a schematic diagram of an electric apparatus using a lithium-ion battery as a power source according to an embodiment of this application.

FIG. 6 shows an electric apparatus as an example. The electric apparatus is a battery electric vehicle, a hybrid electric vehicle, a plug-in hybrid electric vehicle, or the like. To meet a requirement of the electric apparatus for high power and high energy density of a lithium-ion battery, a battery pack or a battery module may be used.

In another example, the apparatus may be a mobile phone, a tablet computer, a notebook computer, or the like. The apparatus is generally required to be light and thin, and may use the lithium-ion battery as a power source.

EXAMPLES

The following describes in detail examples in this application. The examples described below are exemplary and only used to explain this application, but cannot be understood as a limitation on this application. Examples whose technical solutions or conditions are not specified are made based on technical solutions or conditions described in documents in the art, or made based on the product specification. The reagents or instruments used are all conventional products that can be purchased on the market if no manufacturer is indicated.

Examples 1 to 30

(1) Preparation of Positive Electrode Plate

A positive electrode active material lithium iron phosphate ($D_v50$ is 1.4 μm), a positive electrode pre-lithiation agent ($D_v50$ is 6 μm; for specific types, refer to Table 1 below), a binder polyvinylidene fluoride (PVDF), and a conductive agent acetylene black were dissolved in a solvent N-methylpyrrolidone (NMP) at a mass ratio of (97-W1):W1:2:1, and were fully stirred and mixed to obtain a positive electrode slurry. The positive electrode slurry was uniformly applied onto a positive electrode current collector aluminum foil, followed by drying, cold pressing, and cutting, to obtain a positive electrode plate.

(2) Preparation of Negative Electrode Plate

A negative electrode active material artificial graphite, a conductive agent acetylene black, a binder styrene-butadiene rubber (SBR), and a thickener sodium carboxymethyl cellulose (CMC-Na) were dissolved in a solvent deionized water at a mass ratio of 95:2:2:1, and were uniformly mixed with the solvent deionized water to obtain a negative electrode slurry. The negative electrode slurry was uniformly applied onto a negative electrode current collector copper foil, followed by drying, cold pressing, and cutting, to obtain a negative electrode plate.

(3) Preparation of Electrolyte

In an argon atmosphere glove box (atmosphere: $H_2O<0.1$ ppm, and $O_2<0.1$ ppm), 1 mol/L $LiPF_6$ was dissolved in an organic solvent (EC/DMC/EMC=1/1/1 (mass ratio)), an electrolyte additive was added as shown in Table 1 below, and the mixture was uniformly stirred to obtain a corresponding electrolyte.

(4) Preparation of Separator: a Conventional Polypropylene Film was used as a Separator.

(5) Preparation of Lithium-ion Battery

The positive electrode plate, the separator, and the negative electrode plate were sequentially stacked, so that the separator was located between the positive electrode plate and the negative electrode plate for separation, and then were made into an electrode assembly through winding. The electrode assembly was placed into a battery housing aluminum-plastic film bag which was filled with the electrolyte after drying, followed by processes such as chemical conversion and standing, to obtain a lithium-ion battery.

Comparative Examples 1 to 5

In addition to the adjusted types and percentages of the pre-lithiation agents and those of the electrolyte additives as shown in Table 1 below, lithium-ion batteries were prepared by using the same manner as in the foregoing Examples 1 to 30.

TABLE 1

Preparation parameters of LFP battery

| No. | Pre-lithiation agent and its mass percentage W1 in positive electrode active material layer (wt %) | | Electrolyte additive and its mass percentage W2 in electrolyte (wt %) | | Molar ratio B of electrolyte additive to pre-lithiation agent added initially |
|---|---|---|---|---|---|
| Example 1 | $Li_2Cu_{0.6}Ni_{0.4}O_2$ | 2 | Compound 1-1 | 1 | 0.226 |
| Example 2 | $Li_2Cu_{0.6}Ni_{0.4}O_2$ | 2 | Compound 1-2 | 1 | 0.223 |
| Example 3 | $Li_2Cu_{0.6}Ni_{0.4}O_2$ | 2 | Compound 1-3 | 1 | 0.200 |
| Example 4 | $Li_2Cu_{0.6}Ni_{0.4}O_2$ | 2 | Compound 1-4 | 1 | 0.177 |
| Example 5 | $Li_2Cu_{0.6}Ni_{0.4}O_2$ | 2 | Compound 1-5 | 1 | 0.182 |
| Example 6 | $Li_2Cu_{0.6}Ni_{0.4}O_2$ | 2 | Compound 1-6 | 1 | 0.179 |
| Example 7 | $Li_2Cu_{0.6}Ni_{0.4}O_2$ | 2 | Compound 2-1 | 1 | 0.127 |
| Example 8 | $Li_2Cu_{0.6}Ni_{0.4}O_2$ | 2 | Compound 2-2 | 1 | 0.112 |
| Example 9 | $Li_2Cu_{0.6}Ni_{0.4}O_2$ | 2 | Compound 2-3 | 1 | 0.112 |
| Example 10 | $Li_2Cu_{0.6}Ni_{0.4}O_2$ | 2 | Compound 2-4 | 1 | 0.112 |
| Example 11 | $Li_2Cu_{0.6}Ni_{0.4}O_2$ | 2 | Compound 2-5 | 1 | 0.106 |
| Example 12 | $Li_2Cu_{0.6}Ni_{0.4}O_2$ | 2 | Compound 2-6 | 1 | 0.095 |
| Example 13 | $Li_2Cu_{0.6}Ni_{0.4}O_2$ | 0.1 | Compound 2-4 | 1 | 2.241 |
| Example 14 | $Li_2Cu_{0.6}Ni_{0.4}O_2$ | 1 | Compound 2-4 | 1 | 0.224 |
| Example 15 | $Li_2Cu_{0.6}Ni_{0.4}O_2$ | 5 | Compound 2-4 | 1 | 0.045 |
| Example 16 | $Li_2Cu_{0.6}Ni_{0.4}O_2$ | 8 | Compound 2-4 | 1 | 0.028 |
| Example 17 | $Li_2Cu_{0.6}Ni_{0.4}O_2$ | 10 | Compound 2-4 | 1 | 0.023 |
| Example 18 | $Li_2Cu_{0.6}Ni_{0.4}O_2$ | 2 | Compound 2-4 | 0.01 | 0.001 |
| Example 19 | $Li_2Cu_{0.6}Ni_{0.4}O_2$ | 2 | Compound 2-4 | 0.1 | 0.011 |
| Example 20 | $Li_2Cu_{0.6}Ni_{0.4}O_2$ | 2 | Compound 2-4 | 0.5 | 0.056 |
| Example 21 | $Li_2Cu_{0.6}Ni_{0.4}O_2$ | 2 | Compound 2-4 | 2 | 0.225 |
| Example 22 | $Li_2Cu_{0.6}Ni_{0.4}O_2$ | 2 | Compound 2-4 | 5 | 0.562 |
| Example 23 | $Li_2Cu_{0.6}Ni_{0.4}O_2$ | 2 | Compound 2-4 | 10 | 1.124 |
| Example 24 | $Li_2Cu_{0.6}Ni_{0.4}O_2$ | 2 | Compound 2-4 | 20 | 2.248 |
| Example 25 | $Li_2NiO_2$ | 2 | Compound 2-4 | 1 | 0.110 |
| Example 26 | $Li_2CuO_2$ | 2 | Compound 2-4 | 1 | 0.115 |
| Example 27 | $Li_5FeO4$ | 2 | Compound 2-4 | 1 | 0.163 |
| Example 28 | $Li_5FeO4$ | 1.5 | Compound 2-4 | 1 | 0.217 |
| Example 29 | $Li_6CoO_4$ | 2 | Compound 2-4 | 1 | 0.173 |
| Example 30 | $Li_6CoO_4$ | 1 | Compound 2-4 | 1 | 0.348 |
| Comparative Example 1 | $Li_2Cu_{0.6}Ni_{0.4}O_2$ | 2 | / | / | / |
| Comparative Example 2 | $Li_2NiO_2$ | 2 | / | / | / |
| Comparative Example 3 | $Li_2CuO_2$ | 2 | / | / | / |
| Comparative Example 4 | $Li_5FeO_4$ | 2 | / | / | / |
| Comparative Example 5 | $Li_6CoO_4$ | 2 | / | / | / |

Note:
$D_v50$ of positive electrode pre-lithiation agent: 6 μm; $D_v50$ of positive electrode active material: 1.4 μm

Examples 31 to 42

In addition to the adjusted median particle sizes by volume $D_v50$ of the pre-lithiation agents, $D_v50$ of the positive electrode active materials, and the ratios A of the $D_v50$ of the pre-lithiation agents to the $D_v50$ of the positive electrode active materials as shown in Table 2 below, lithium-ion batteries were prepared by using the same manner as in the foregoing Example 10.

TABLE 2

Preparation parameters of LFP battery

| No. | $D_v50$ of positive electrode pre-lithiation agent (μm) | $D_v50$ of positive electrode active material (μm) | Ratio A of $D_v50$ of positive electrode pre-lithiation agent to $D_v50$ of positive electrode active material |
|---|---|---|---|
| Example 31 | 2.0 | 1.4 | 1.4 |
| Example 32 | 4.0 | 1.4 | 2.9 |
| Example 33 | 6.0 | 1.4 | 4.3 |
| Example 34 | 8.0 | 1.4 | 5.7 |
| Example 35 | 12.0 | 1.4 | 8.6 |
| Example 36 | 14.0 | 9.4 | 1.5 |
| Example 37 | 16.0 | 4.4 | 3.6 |
| Example 38 | 22.0 | 7.4 | 3.0 |
| Example 39 | 0.3 | 1.4 | 0.2 |
| Example 40 | 1.0 | 1.4 | 0.7 |
| Example 41 | 15.0 | 1.4 | 10.7 |
| Example 42 | 21.0 | 1.4 | 15 |

Note:
Positive electrode pre-lithiation agent ($Li_2Cu_{0.6}Ni_{0.4}O_2$): 2 wt %; Compound 2-4: 1 wt %

The following describes a method for testing physical parameters of the positive electrode active materials, the positive electrode pre-lithiation agents, and the positive electrode plates.

The median particle size by volume $D_v50$ has a meaning well known in the art, and may be measured by using an instrument and a method that are well known in the art. For example, in accordance with GB/T 19077-2016 particle size distribution laser diffraction method, a laser particle size analyzer may be used for convenient measurement. In this application, a laser particle size analyzer of Mastersizer 2000E model from the England Malvern Instruments Limited is used for measurement. The measurement results are shown in Table 2.

The following describes test procedures for the lithium-ion batteries.

1. Capacity test of lithium-ion battery

At 25° C., the lithium-ion batteries were charged to 3.65 V at a constant current of 0.33 C, then charged to a current less than 0.05 C at a constant voltage of 3.65 V, and discharged to 2.5 V at a constant current of 0.33 C. Actual capacities were recorded as C0s (mAh). Specific capacity of the lithium-ion battery is C0/W3 (mAh/g), and W3 is a mass (g) of the positive electrode active substance and the positive electrode pre-lithiation agent. The capacity test results of the lithium-ion batteries are shown in Table 3 below.

2. Rate performance test of lithium-ion battery after storage

At 25° C., the lithium-ion batteries were charged to 3.65 V at a constant current of 0.33 C, then charged to a current less than 0.05 C at a constant voltage of 3.65 V, and discharged to 2.5 V at a constant current of 0.33 C. Actual capacities were recorded as C0s. Then, at 25° C., the batteries were charged to 3.65 V at a constant current of 0.33 C, and then charged to a current less than 0.05 C at a constant voltage of 3.65 V. The batteries at that time were in a fully-charged state, and then the fully charged batteries were placed in a 60° C. thermostat for storage. The lithium-ion batteries were taken out from the 60° C. thermostat every other month, and actual capacities C of the lithium-ion batteries were measured at 25° C., until C faded to 90% of C0. At 25° C., the lithium-ion batteries were charged to 3.65 V at a constant current of 0.33 C, then charged to a current less than 0.05 C at a constant voltage of 3.65 V, and discharged to 2.5 V at a constant current of 2 C. Actual capacities were recorded as C1s (mAh). Discharge capacity retention rate of lithium-ion battery at 2 C after stored at 60° C. to 90% SOH=(C1)/C0×100%. The test results of the discharge capacity retention rates of the lithium-ion batteries are shown in Table 3 below. Therefore, the rate performance of the lithium-ion battery after high-temperature storage is evaluated based on the discharge capacity retention rate at 2 C after high-temperature storage.

TABLE 3

Test results of LFP battery

| No. | Specific capacity of lithium-ion battery (mAh/g) | Discharge capacity retention rate of lithium-ion battery at 2 C after stored at 60° C. to 90% SOH |
|---|---|---|
| Example 1 | 147.2 | 72.5% |
| Example 2 | 148.0 | 74.9% |
| Example 3 | 148.1 | 75.0% |
| Example 4 | 148.2 | 75.1% |
| Example 5 | 147.5 | 73.3% |
| Example 6 | 147.3 | 72.5% |
| Example 7 | 148.2 | 73.6% |
| Example 8 | 148.1 | 73.1% |
| Example 9 | 148.0 | 72.9% |
| Example 10 | 148.4 | 75.7% |
| Example 11 | 148.2 | 74.6% |
| Example 12 | 148.0 | 73.9% |
| Example 13 | 142.4 | 75.1% |
| Example 14 | 147.1 | 75.4% |
| Example 15 | 143.9 | 73.9% |
| Example 16 | 141.2 | 72.6% |
| Example 17 | 138.6 | 71.4% |
| Example 18 | 147.0 | 71.4% |
| Example 19 | 147.3 | 72.1% |
| Example 20 | 147.8 | 74.3% |
| Example 21 | 148.0 | 75.0% |
| Example 22 | 147.5 | 73.6% |
| Example 23 | 147.3 | 72.0% |
| Example 24 | 147.1 | 71.1% |
| Example 25 | 146.9 | 75.1% |
| Example 26 | 147.1 | 74.3% |
| Example 27 | 149.0 | 72.2% |
| Example 28 | 146.7 | 73.4% |
| Example 29 | 149.5 | 70.5% |
| Example 30 | 145.2 | 72.2% |
| Comparative Example 1 | 147.0 | 71.0% |
| Comparative Example 2 | 145.4 | 70.4% |
| Comparative Example 3 | 145.7 | 69.7% |
| Comparative Example 4 | 147.5 | 67.7% |
| Comparative Example 5 | 148.1 | 65.4% |
| Example 31 | 147.6 | 72.6% |
| Example 32 | 148.0 | 74.5% |
| Example 33 | 148.4 | 75.7% |
| Example 34 | 148.2 | 75.0% |
| Example 35 | 147.7 | 73.2% |
| Example 36 | 147.8 | 72.0% |
| Example 37 | 148.2 | 74.8% |
| Example 38 | 148.0 | 74.1% |
| Example 39 | 147.2 | 71.2% |
| Example 40 | 147.4 | 72.0% |
| Example 41 | 147.3 | 71.9% |
| Example 42 | 147.1 | 71.3% |

It can be seen from a comparison between Examples 10, 25 to 27, and 29 and Comparative Examples 1 to 5 in Table 3 that, under the condition that the types and the percentages of the pre-lithiation agents are the same respectively, the specific capacities and the discharge capacity retention rates at 2 C after high-temperature storage of the lithium-ion batteries in Examples 10, 25 to 27, and 29 with the electrolyte additive added are all better than those in Comparative Examples 1 to 5 without adding the electrolyte additive respectively. Under the condition that the types and the percentages of the pre-lithiation agents are the same, compared with Comparative Example 1 without adding the electrolyte additive, the specific capacities and the discharge capacity retention rates at 2 C after high-temperature storage of the lithium-ion batteries in Examples 1 to 12 with any electrolyte additive (compounds 1-1 to 1-6 and compounds 2-1 to 2-6) added are all more excellent.

In addition, it can be seen from a comparison among Example 10, Examples 25 to 27, and Example 29 that, under the condition that the types and the percentages of the electrolyte additives are the same and the percentages of the pre-lithiation agents are the same, $Li_2Cu_{0.6}Ni_{0.4}O_2$ used as the pre-lithiation can realize a more excellent effect. As described above, it is supposed that a reason may be that using the pre-lithiation agent and the electrolyte additive in combination has a synergistic effect on increasing the specific capacity of the lithium-ion battery and improving the rate performance of the lithium-ion battery, especially the rate performance after high-temperature storage. Therefore, even if under the condition that the types and the percentages of the electrolyte additives are the same and the percentages of the pre-lithiation agents are the same, when the types of the pre-lithiation agents are different, the specific capacities and rate performance after high-temperature storage of the lithium-ion batteries are also different.

In addition, it can be seen from two groups of Examples 10 and 13 to 17 and Examples 10 and 18 to 24 that, under the condition that the pre-lithiation agents and the electrolyte additives are used in combination and their percentages meet the ranges in this application, excellent specific capacities and rate performance after high-temperature storage of the lithium-ion batteries can be realized.

It can be seen from a comparison between Examples 31 to 35 and Examples 39 to 42 that, compared with Examples 39 to 42 in which the ratios A do not meet the range ($1 \le A \le 10$) in this application, Examples 31 to 35 in which the ratios A meet the range in this application can realize excellent specific capacities and rate performance after high-temperature storage of the lithium-ion batteries.

In addition, it can be seen from a comparison between Examples 1 to 15 and Examples 16 and 17 that addition of large amounts of the pre-lithiation agents leads to a decrease in the specific capacities of the batteries. It is supposed that a reason is that addition of the large amounts of the pre-lithiation agents leads to a decrease in the proportions of the positive electrode active materials, resulting in a decrease in the specific capacities of the batteries. It can be seen from a comparison between Comparative Examples 1 to 5 and Examples 16 and 17 that, even if addition of large amounts of pre-lithiation agents leads to a decrease in the specific capacities of the batteries in Examples 16 and 17, the rate performance after high-temperature storage of the batteries in Examples 16 and 17 are still better than those in Comparative Examples 1 to 5. To sum up, using the pre-lithiation agent and the electrolyte additive in combination in this application can improve the rate performance after high-temperature storage of the lithium-ion battery and increase the specific capacity of the battery (compared with the conventional battery without adding the pre-lithiation agent).

It should be noted that this application is not limited to the foregoing embodiments. The foregoing embodiments are merely examples, and embodiments having constructions substantially the same as those of the technical ideas and having the same effects as the technical ideas within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A lithium-ion battery, wherein the lithium-ion battery comprises a positive electrode active material layer and an electrolyte, wherein the positive electrode active material layer comprises a positive electrode active material and a pre-lithiation agent, and the pre-lithiation agent is a lithium metal oxide pre-lithiation agent comprising one or more of $Li_6CoO_4$, $Li_5FeO_4$, $Li_3VO_4$, $Li_2MoO_3$, $Li_2RuO_3$, $Li_2MnO_2$, the electrolyte comprises an additive, and the additive comprises at least one of compound 1 shown in constitutional formula (I) and compound 2 shown in constitutional formula (II), wherein consitutional formula (I)

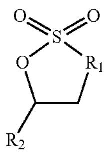

in the constitutional formula (I), $R_1$ is an oxygen atom or methylene, and $R_2$ is a hydrogen atom, a halogen atom, an alkyl group having 1 to 3 carbon atoms, a halogenated alkyl group having 1 to 3 carbon atoms, or an alkoxy group having 1 to 3 carbon atoms, and constitutional formula (II)

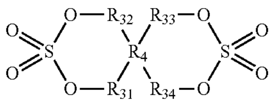

in the constitutional formula (II), $R_{31}$, $R_{32}$, $R_{33}$, and $R_{34}$ are each independently selected from a single bond or methylene, and $R_4$ is

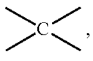, 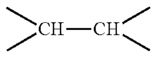, or 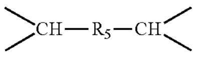, wherein $R_5$ is an alkylidene group having 1 to 3 carbon atoms, a halogenated alkylidene group having 1 to 3 carbon atoms, or an alkyleneoxy group having 1 to 3 carbon atoms, wherein during the charging of the battery cell, the at least one of compound 1 shown in constitutional formula (I) and compound 2 shown in constitutional formula (II) in the electrolyte of the lithium-ion battery forms a film on the pre-lithiation agent and/or the pre-lithiation agent with lithium released, after the film is formed, a molar ratio C of element sulfur(S) contained in a positive electrode plate to a sum of the pre-lithiation agent and the pre-lithiation agent with lithium released satisfies $0.01 \le C \le 1$.

2. The lithium-ion battery according to claim 1, wherein the pre-lithiation agent comprises one or more of $Li_3VO_4$, $Li_2MoO_3$, $Li_2MnO_2$.

3. The lithium-ion battery according to claim 1, wherein a mass percentage W1 of the pre-lithiation agent in the positive electrode active material layer satisfies 0.1%≤W1≤10%.

4. The lithium-ion battery according to claim 3, wherein the mass percentage W1 satisfies 0.5%≤W1≤8%.

5. The lithium-ion battery according to claim 1, wherein a median particle size by volume $D_v50$ of the pre-lithiation agent is 0.1 μm-30 μm, and a median particle size by volume $D_v50$ of the positive electrode active material is 0.1 μm-10 μm.

6. The lithium-ion battery according to claim 1, wherein a ratio A of the median particle size by volume $D_v50$ of the pre-lithiation agent to the median particle size by volume $D_v50$ of the positive electrode active material satisfies 1≤A≤10.

7. The lithium-ion battery according to claim 6, wherein the ratio A satisfies 2≤A≤8.

8. The lithium-ion battery according to claim 1, wherein in the constitutional formula (II), $R_4$ is

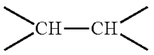 or 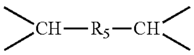, where $R_5$ is an alkylidene group having 1 to 3 carbon atoms or an alkyleneoxy group having 1 to 3 carbon atoms.

9. The lithium-ion battery according to claim 1, wherein the compound 1 comprises one or more of the following compounds:

compound 1-1

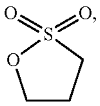

compound 1-2

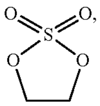

compound 1-3

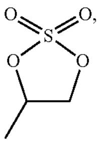

compound 1-4

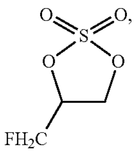

compound 1-5

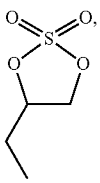 and

-continued compound 1-6

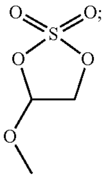

and the compound 2 comprises one or more of the following compounds:

compound 2-1

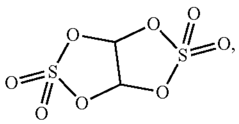

compound 2-2

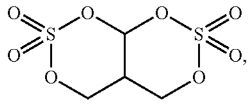

compound 2-3

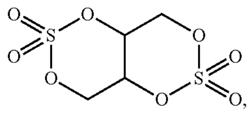

compound 2-4

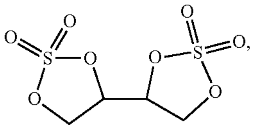

compound 2-5

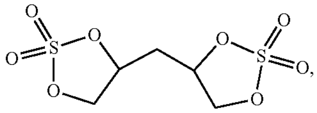 and compound 2-6

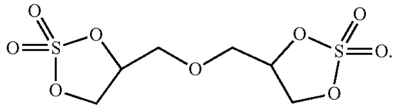

10. The lithium-ion battery according to claim 1, wherein a mass percentage W2 of the compound 1 and the compound 2 in the electrolyte satisfies 0.01%≤W2≤ 20%.

11. The lithium-ion battery according to claim 10, wherein the mass percentage W2 satisfies 0.1%≤W2≤10%.

12. The lithium-ion battery according to claim 1, wherein a molar ratio B of a sum of the compound 1 and the compound 2 to the pre-lithiation agent satisfies 0.01≤B≤2.3.

13. The lithium-ion battery according to claim 1, wherein the additive comprises the compound 2 shown in constitutional formula (II).

14. The lithium-ion battery according to claim 13, wherein the compound 2 comprises one or more of the following compounds:

compound 2-1

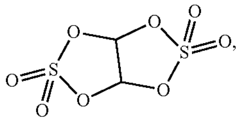

compound 2-2

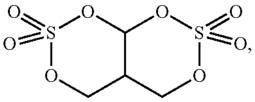

compound 2-3

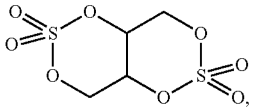

compound 2-4

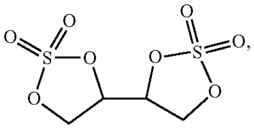

-continued compound 2-5

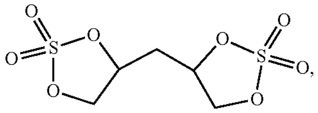

and compound 2-6

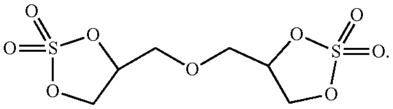

15. A battery module, comprising the lithium-ion battery according to claim 1.

16. A battery pack, comprising the battery module according to claim 15.

17. An electric apparatus, comprising at least one of the lithium-ion battery according to claim 1, the battery module according to claim 15, or the battery pack according to claim 13.

* * * * *